Aug. 1, 1939.　　　C. STAUFERT　　　2,168,249
BRAKE FOR SPINNING OR TWISTING SPINDLES
Filed March 17, 1939
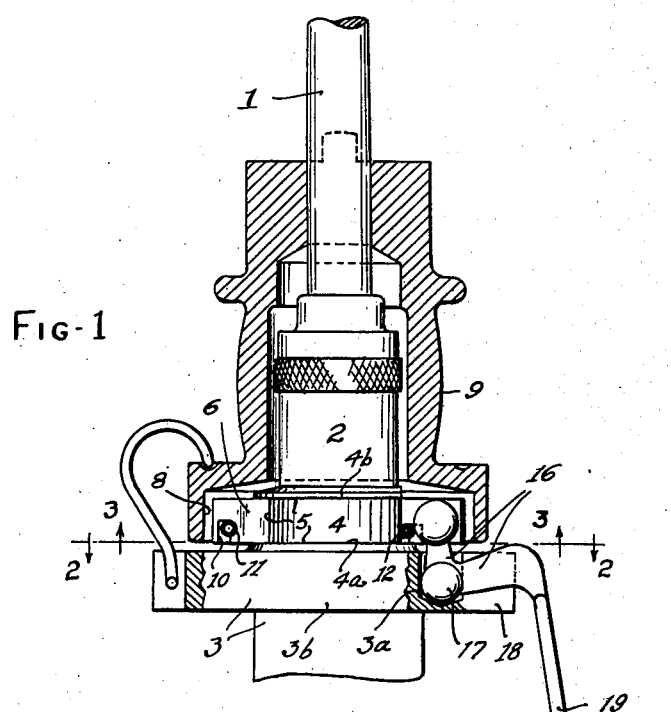
Fig-1
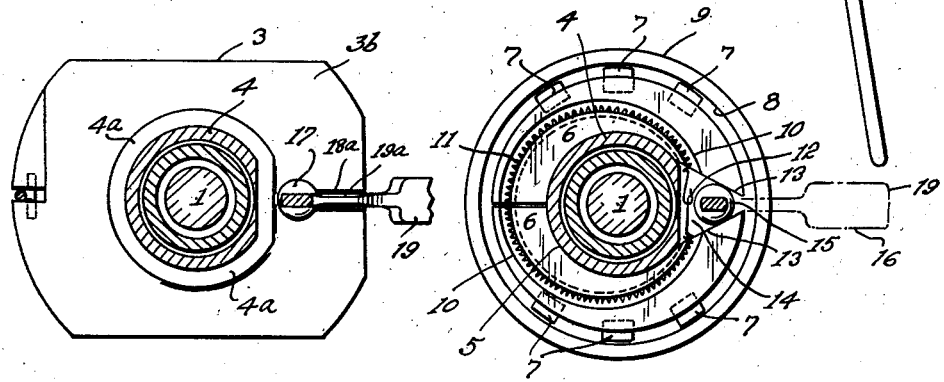
Fig-2　　　　Fig-3
INVENTOR.
CARL STAUFERT
BY
ATTORNEY.

Patented Aug. 1, 1939

2,168,249

UNITED STATES PATENT OFFICE 2,168,249

BRAKE FOR SPINNING OR TWISTING SPINDLES

Carl Staufert, Stuttgart-Bad Cannstatt, Germany

Application March 17, 1939, Serial No. 262,437
In Germany April 1, 1938

5 Claims. (Cl. 57—88)

This invention relates to a brake for spinning and twisting spindles which conventionally are driven by flexible bands or belts, and require stopping in order to doff and replace bobbins thereon,—and at other times, as is well known.

Prior to the present invention, brake devices, adapted for stopping of spindles, have been arranged in various ways, but each operated at a disadvantage, particularly when applied to spindles having flexibly supported bearings (as collar bearings and/or footstep bearings), principally because the brake devices exerted unbalanced forces on the spindle, either radially or axially thereof to the detriment of the bearings or the proper operation of the spindle. Some were too complicated for practical use.

An object of the present invention is to provide an improved brake mechanism for textile spindles.

A further object is to provide a spindle brake which is simple in construction, unlikely to be damaged in use, easy to operate, and which will not impose unbalanced or eccentric loads on the spindle or its bearings.

Other objects of the invention and the various advantages of the construction will become apparent from the following description of a preferred embodiment. The essential characteristics are summarized in the claims.

In the drawing, Fig. 1 is a fragmentary longitudinal side view showing portions of a textile spindle adjacent the whorl and upper or collar bearing region, the whorl and portions of the brake actuator support being shown in central section; and Figs. 2 and 3 are sectional views taken as indicated at 2—2 and 3—3 on Fig. 1.

Referring in detail to the drawing, the spindle 1 turns in a bearing shown at 2 which can be flexibly or elastically mounted in a bolster case 3 in any known or suitable manner. The lower end of the spindle (not shown) is supported in a downward extension of the bolster case. The bolster case has a neck 4 provided with an annular groove or channel 5 defined, in part, by shoulder and flange portions 4a and 4b of the neck.

The brake mechanism includes two shoes 6 of ring-segment form, which, together, nearly encircle the neck 4 and lie partially within the annular groove 5 in slidable contact with the shoulder 4a and flange 4b. The shoes have free floating movement in a plane normal to the spindle axis. Each shoe has one or more friction members 7 which can be circumferentially spaced inset blocks of fiber or other suitable material with radially exposed surfaces adapted for simultaneous braking contact with the inner rim or wall surface 8 of the base portion of the whorl 9 which is drivingly rigid with the spindle.

The brake shoes normally are pressed against the neck 4 of the bolster case by an annularly continuous spring 11 (coil spring as shown) which is held in place by its own tension, the spring being seated in undercut portions of an annular slot 10, parts of which are formed in respective brake shoes. The ends of the spring can be hooked together as at 12. The undercut prevents the spring from dropping out. The slot 10 can be concentric to the brake mechanism or eccentric thereto as shown in Fig. 3. One pair of ends of the shoes 6 are parallel and in close proximity and the opposite ends are formed as beveled planes 13 leaving a wedge-shaped space 14 for receiving a ball head 15 of a brake actuating lever 16.

The lever has a short arm depending from the ball end to a spherical formation 17 which seats in the bottom of a socket 3a formed as a short vertical bore in a flange portion 3b of the bolster case. A radial slot 18 in the flange 3b guides the shank portion of a longer arm 19 of the lever and prevents rotation of the lever in a horizontal plane. The arm 19 depends from the outer end of the guiding slot, adjacent the mounting for the bolster case and protrudes a sufficient distance so that it can readily be moved as by the operator's hand or his knee, whichever is more convenient, as determined by the elevation at which the spindle is mounted.

There is an adequate space between the ball end 15 and the annular groove 5, which may have a plane faced portion as indicated, for accommodating the mutually engaged ends of the spring 11. In case the spring slot 10 is concentric with the spindle, then the engaged ends of the spring can lie outwardly from the ball end of the actuating lever.

If desired the adjacent surfaces of the slot 18 and the horizontally extending portion of the arm 19 can be relatively rounded or oppositely beveled as indicated at 18a and 19a on Fig. 2 so that the arm 19 can be swung slightly transversely to its normal operating plane in opposite directions. This reduces likelihood of breakage of the lever in the event of carelessness on part of the operator in pressing the arm 19 to apply the brake.

In operation from a state of rest, as illustrated, pressure on the arm 19 toward the spindle rail causes the ball end 15 to spread the adjacent beveled ends of the brake shoes, abutment of the opposite shoe ends, and then simultaneous braking action of the friction surfaces on the inner rim 8 of the whorl. One shoe cannot cause braking prior to the braking action of the other because of the free floating of the shoes and of the fact that each shoe requires the braking of the other as reactance to enable it to effect braking. Until the condition just stated is satisfied, the shoes will rotate slightly about the neck 4. Thus unequal wear on the friction surfaces and on the beveled ends 13 of the shoes is inconsequential and the braking action cannot result in the imposition of unilateral or unbalanced radial loads on the spindle.

In addition to being very simple and fool-proof in construction, the brake can be easily and quickly mounted and dismounted without special tools and without having to remove the spindle case from its frame. No pins or pegs, or intricate borings for such, are necessary to hold the parts in operating position.

I claim:

1. A braking mechanism for a textile spindle having a housing, comprising arcuate shoe members seated for floating movement in a guiding groove of the housing, an annular spring which engages an undercut groove in faces of the shoes which are directed endwise of the spindle, whereby the spring will maintain itself in place and be housed by the shoes.

2. The combination with a textile spindle having an internal circular braking surface on a rotary part thereof and a fixed housing, of brake shoes floatingly mounted on said housing and adapted to engage the surface, the shoes having outwardly converging end surfaces within the internal circular braking surface, and an actuating lever having a substantially spherical end for engaging the converging end surfaces of the shoes, a substantially spherical fulcrum seated in a socket in the fixed housing, and an arm which extends outwardly from the fulcrum in a slot of the housing which slot is less wide than the fulcrum.

3. The braking mechanism according to claim 2 wherein the surfaces of the outwardly extending arm portion of the lever and of the slot are so related as to permit limited turning of the arm portion on an axis passing through the slot, and the free end of the lever depends adjacent the spindle housing for a substantial distance.

4. In a textile spindle having a bolster case, a brake comprising two shoes floatingly mounted on the bolster case so that they can move circumferentially and radially relative to the main spindle axis, means yieldably retaining the shoes normally pressed against the bolster case, and an actuator adapted and arranged to engage end portions of the shoes and press the shoes outwardly simultaneously against an adjacent inwardly facing circular surface of the spindle.

5. Mechanism according to claim 4, comprising two arcuate shoes which, in mounted position on the bolster case, are slightly spaced apart at mutually adjacent ends for mutual abutment, and, at the opposite ends, beveled in opposite directions for abutment with the actuator, which shoes are held together by an annular spring which operatively embraces the shoes.

CARL STAUFERT.